United States Patent [19]

Kühn

[11] Patent Number: 4,750,912

[45] Date of Patent: Jun. 14, 1988

[54] EXHAUST METHOD FOR DYEING FINE-DENIER POLYESTER FIBERS IN DARK SHADES WITH DISPERSE DYE MIXTURES

[75] Inventor: Reinhard Kühn, Frankfurt am Main, Fed. Rep. of Germany

[73] Assignee: Hoechst Aktiengesellschaft, Frankfurt am Main, Fed. Rep. of Germany

[21] Appl. No.: 899,531

[22] Filed: Aug. 22, 1986

[30] Foreign Application Priority Data

Aug. 24, 1985 [DE] Fed. Rep. of Germany ....... 3530339

[51] Int. Cl.$^4$ .................. C09B 67/22; D06P 1/18; D06P 3/54
[52] U.S. Cl. .............................................. 8/639; 8/922
[58] Field of Search .................................. 8/639, 529

[56] References Cited

U.S. PATENT DOCUMENTS 4,381,262 4/1983 Bühler et al. .................... 534/850
4,422,854 12/1983 Hähnle et al. ........................ 8/471

FOREIGN PATENT DOCUMENTS 147783 7/1985 European Pat. Off. .
1542880 3/1979 United Kingdom .

OTHER PUBLICATIONS

Derwent Abstract No. 83-815440/46, correspond to German 32 16 788 (Nov. 10, 1983).
Derwent Abstract No. 84-070051/12, corresponding to German 32 34 186 (Mar. 15, 1984).

*Primary Examiner*—A. Lionel Clingman
*Attorney, Agent, or Firm*—Connolly & Hutz

[57] ABSTRACT

Polyester fibers which have a linear density of less than 0.1 den and a polyurethane content cannot be dyed in deep, bloomy blacks with the commercially available black and navy mixtures based on blue, yellow and red disperse dyes. This problem is overcome by using blue components which are derived from mixtures of selected disperse dyes of diazotized 1-amino-2,6-dicyano-4-nitrobenzene and coupling components from the series of specifically substituted N,N-dialkylanilines as a constituent for the trichromatic system.

6 Claims, No Drawings

EXHAUST METHOD FOR DYEING FINE-DENIER POLYESTER FIBERS IN DARK SHADES WITH DISPERSE DYE MIXTURES

The present invention relates to a process for dyeing textile materials made of fine-denier polyester (PES) fibers which have a linear density of less than 0.1 den (<0.011 tex) and may contain up to 40% by weight of polyurethane (PUR) in deep black, navy or blackish brown shades by the exhaust method with disperse dye mixtures composed of one or more of each of a blue, yellow and red component.

The abovementioned shades are generally produced by means of mixtures of blue, yellow and red disperse dyes, in which one or other color component can also be present more than once, as for example in the case of two different blue components. Dye mixtures on the abovementioned basis and in suitable composition for dyeing black and navy are commercially available in complete formulations to meet the general demand.

Dyeing polyester fibers having a linear density of greater than 0.1 den (< 0.011 tex) in black, navy or deep brown shades with disperse dyes presents as such no problems to the skilled worker and is widely known in practice.

Of late, the range of commercially available polyester fibers also includes products having a linear density of less than 0.1 den, which are special in some respects as regards dyeing. Before dealing in more detail with this field, it should be stated that for the purposes of the present invention the fine-denier fibers are fibers having a linear density (count) of 0.1 den or below.

Whereas, then, as previously stated, polyester fibers having a linear density of above 0.1 den do not present any insurmountable difficulties in the dyeing of in particular deep shades when the abovementioned dark shades are to be dyed with the, in this respect, conventional mixtures of disperse dyes, it is no longer possible, by contrast to use these customary black mixtures to obtain satisfactory dyeings in a full, bloomy black on polyester fibers having a linear density of less than 0.1 den even if modified process conditions are used. The currently available, preformulated black and navy mixtures based on one blue, yellow and red component each produce in this respect at best dirty anthracite colors. The problems discussed here even increase in severity with decreasing denier, i.e. increasing fineness of the fiber.

A further unique feature of textile material made of the stated types of PES fine-denier fibers is its additional polyurethane content which is frequently included for special purposes and which then no longer permits such substrate to be dyed at temperatures of 130° C. or higher, as would actually be necessary to fix most of the known dye mixtures of this generic category. But even under these thermal conditions which are extreme for the fiber material in question, conventional black mixtures do not produce a deep black on a material modified in this way.

Under the existing conditions, no dyer or finisher concerned with the application of dyes was thus heretofore able to dye polyester fibers having a linear density of 0.04 den (0.0044 tex) and properties modified by a possible PUR content with the black mixtures available in the field in the desired depth of shade.

Fine-denier fibers of the character described are used however chiefly for suede leather imitations, on which dark shades are particularly important and the prime choice.

In the light of the need explained above, the object to be achieved by the present invention was thus to develop a process whereby polyester fibers having a linear density of less than 0.1 den can be dyed with disperse dye mixtures in a deep black, navy or brown, subject to the constraint of a maximum dyeing temperature of 125° C.

It has been found that it is possible to obtain exhaust dyeings in the desired deep shades of black, navy or blackish brown on textile material made of polyester fibers which have a linear density of less than 0.1 den and may contain a polyurethane content by using according to the invention, as the blue components of an additive mixture which is otherwise composed of yellow and red disperse dyes suitable for trichromatic dyeing, disperse dyes of the following general structure

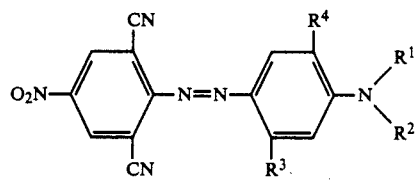

in which $R^1$ and $R^2$, independently of each other, denote ethyl or n-propyl, $R^3$ represents methyl, ethyl, n-propyl, methoxy, ethoxy or the radical —NH—CO—Alk, in which "Alk" can be methyl, ethyl or n-propyl, and $R^4$ stands for hydrogen, methyl, methoxy or ethoxy with the proviso that $R^4$ is hydrogen when $R^3$ symbolizes the radical —NH—CO—Alk, individually or in combination with one another and effecting application to the fiber from an aqueous medium at temperatures up to a maximum of 125° C.

Blue disperse dyes which have the structure shown above, and mixtures thereof, are known and are described in German Offenlegungsschriften DE-A1-3,005,067, DE-A1-3,121,981, DE-A1-3,216,788, DE-A1-3,234,186 and DE-A1-3,347,572.

These specific blue dyes are preferably used for the present invention in the form of mixtures, since separate individual dyes have not proved universally suitable for the stated object.

Within the framework of the blue components composed of the disperse dyes of the structure of the formula shown above, the proportion of the individual dyes, in the event that combinations thereof are present, varies in accordance with the claimed process between 25 and 75 percent by weight.

Under the same preconditions, mixtures of a plurality of such blue component combinations which contain at least two different disperse dyes are likewise of importance for the concern of this invention.

The weight proportion of these blue components composed of the underlying disperse dye or of two or more such dyes of the above structures within the overall composition of the additive color mixture is 15 to 80 percent in the dyeing recipes in question here.

Suitable yellow components for the dyeing according to the invention are preferably one or more disperse dyes of the following formulae:

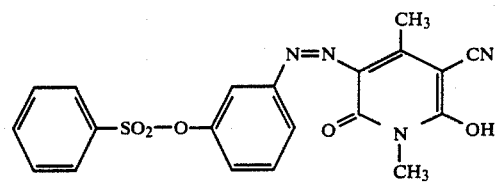

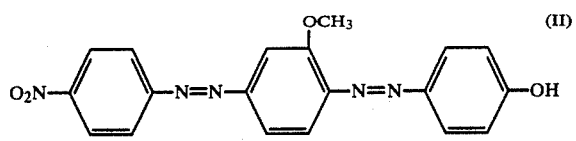

These yellow disperse dyes of the formulae (I) and/or (II) are used in the dyeing recipes according to the invention in amounts of 10 to 30 percent, based on the weight of the total composition of the additive color mixture.

The red components used for the claimed process are preferably ably one or more disperse dyes of the following formulae:

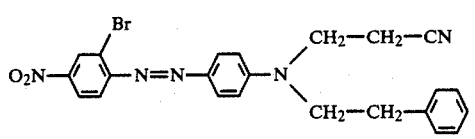

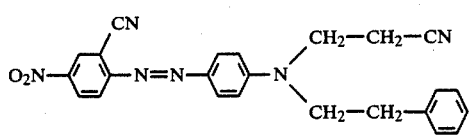

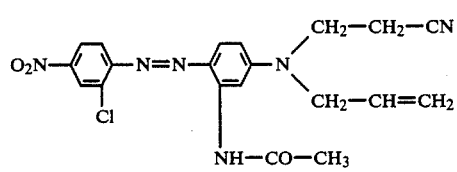

These red disperse dyes of the formulae (III) and/or (IV) and/or (V) are used in the dyeing recipes according to the invention in amounts of 15 to 40 percent, based on the weight of the total composition of the additive color mixture.

In addition, apart from the disperse dyes of the formulae (I) to (V), the color mixtures used according to the invention can additionally contain other yellows, yellow browns and reds having different chemical structures. Irrespectively thereof, however, the choice of disperse dyes for the blue components is strictly limited to the structure in the depicted formula.

Implementation of the dyeing process itself hardly differs from the conventional HT dyeing technique. The textile material is dyed at temperatures up to a maximum of 125° C., preferably at 115° to 120° C., from an aqueouus liquor for a period of 60 to 90 minutes. The process of exhaustion is followed, as usual, by the dyed material being cleared under, usually, reductive conditions, to remove unfixed portions of dye.

The method explained above produces satisfactory black, navy or blackish brown shades on textile structures made of fine-denier PES fibers, for example PES fibers having a denier of 0.04, only on the basis of the blue components according to the invention, which have a comparatively narrowly defined structure, in conjunction with suitable yellow and red components.

Such a result in relation to the dyeing effect obtained was surprising to the skilled worker insofar as the blue components which are involved in the present trichromatic system contains dyes which, if used as individual dyes under the conditions of the claimed process, do not produce the desired effect, but which when combined are suitable for coloration purposes as component of the additive color mixture in question even at relatively low temperatures proposed according to the invention (115° C. to 120° C.), although when considered separately as individual dyes they are otherwise only known as so-called HT dyes, i.e. for application at temperatures around 130° C.

On the other hand, as provided by this invention, the combinations of blue components can also include individual dyes which are otherwise used as typical carrier dyes but which when used on their own as blue dye have proved unsuitable for the object of the invention.

The examples below give information about advantageous mixing ratios of disperse dyes suitable for trichromatic dyeing, but should not be regarded as in any way limiting in this respect.

EXAMPLE 1

A knit of fine denier (0.04 den) polyester fibers is introduced at a liquor ratio of 15:1 into a dyebath which comprise warm water at 40° C. and has been brought to pH 4.5 by means of acetic acid/Na acetate. To this liquor is added as a dispersant 1 g/l of a soluble sulfo-containing polyester as described in German Patent DE-C3-2,508,472, and the textile material is kept in contact with the blank liquor thus made up under the stated temperature conditions.

To obtain a black shade on the material by the trichromatic principle, recourse is possible to an additive color mixture which contains disperse dyes of the structure below in commercially available constitution and in correspondence with the amounts specified below (in each case on weight of dry fiber):

10% of a combination of 65 parts by weight of blue disperse dye of the formula

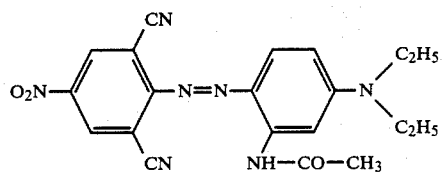

and 35 parts by weight of blue disperse dye of the formula

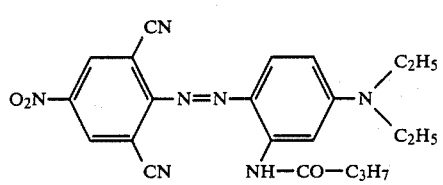

as blue component; 2% of the yellow disperse dye of the formula (I)

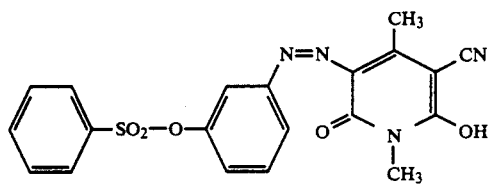

(I)

4% of the yellow disperse dye of the formula (II)

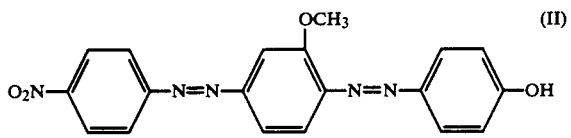

(II)

as yellow components; 4% of the red disperse dye of the formula (III)

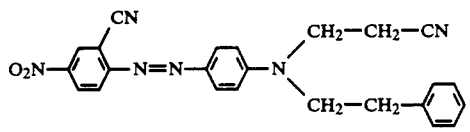

(III)

4% of the red disperse dye of the formula (IV)

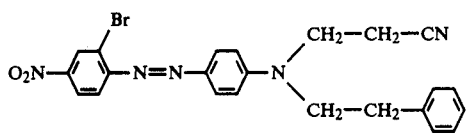

(IV)

as red components.

These dyes are dispersed together in water at 40° C. in a separate mixing vessel, and this dispersion is added after a preliminary circulation time of about 5 to 10 minutes to the bath charged with the fiber material. The liquor plus the material is then heated after 5 minutes to about 120° C. in the course of 30 minutes, and the dyeing is completed at that temperature in the course of 90 minutes.

The dyed textile material is then allowed to cool down and is reduction cleared with an aqueous bath at 80° C. containing, per liter, 5 cm³ of 32.5% strength sodium hydroxide solution and
1 g of hydrosulphite (dithionite)

in the course of about 10 minutes. The concluding rinse with water is followed by drying the material thus treated.

The result obtained is a full black dyeing of the knit.

If the dyeing by the above method is carried out using the various color components of the overall mixture in the same amounts of dye, except that only the first disperse dye of the component is used in the same amount (10%) as the combination of the two blue dyes which was previously used, then the dyeing result obtained on the knit is not a black but merely a dull anthracite.

EXAMPLE 2

A nonwoven textile composed of a fine-denier polyester fiber (0.06 den) is dyed as described in Example 1, except at 115° C., with a mixture of the following dyes (in commercially available constitution) in the amounts specified in each case below:

10% of a combination of 55 parts by weight of the blue disperse dye of the formula

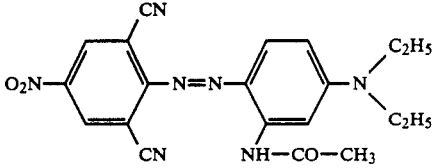

and 45 parts by weight of the blue disperse dye of the formula

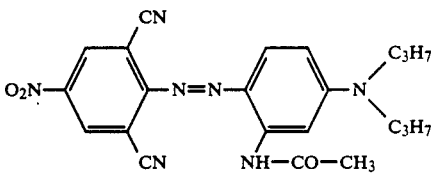

as blue component; 2% of the yellow disperse dye of the formula (II) from Example 1 and 3% of the red disperse dye of the formula (III) from Example 1.

The result obtained on the material after drying is deep navy dyeing.

EXAMPLE 3

A woven fabric made of fine-denier polyester fiber (0.04 den) is dyed as in Example 1, except with a mixture of the following dyes (in commercially available constitution) and in the amounts specified below in each case:

6% of a combination of 62 parts by weight of blue disperse dye of the formula

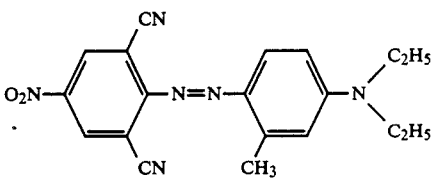

and 38 parts by weight of the blue disperse dye of the formula

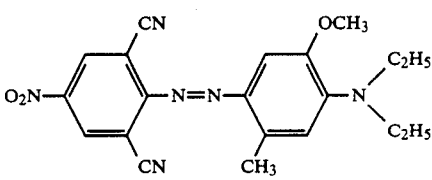

as blue component; 5% of the yellow disperse dye of the formula (II) from Example 1 and 2% of the yellow disperse dye of the formula (I) from Example 1 as yellow component, and 7% of the red disperse dye of the formula (III) from Example 1 as red component.

The result obtained on the material after drying is a brown dyeing.

I claim:

1. A process for dyeing textile material made of fine-denier polyester fibers which have a linear density of less than 0.1 den (<0.011 tex) and may contain up to 40% by weight of polyurethane in deep black, navy or blackish brown shades by the exhaust method with disperse dye mixtures composed of one or more of a blue, yellow and red component each, which comprises using, as blue components for the additive color mixture of the trichromatic system, disperse dyes of the following general structure

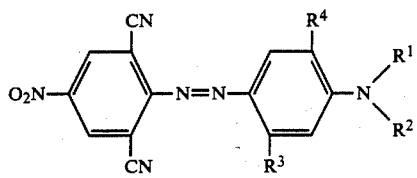

in which
  $R^1$ and $R^2$, independently of each other, denote ethyl or n-propyl,
  $R^3$ represents methyl, ethyl, n-propyl, methoxy, ethoxy or the radical —NH—CO—Alk, in which "Alk" can be methyl, ethyl, or n-propyl, and
  $R^4$ stands for hydrogen, methyl, methoxy or ethoxy with the proviso that $R^4$ is hydrogen when $R^3$ symbolizes the radical —NH—CO—Alk,
individually or in combination with one another and effecting application to the fiber from an aqueous medium at temperatures up to a maximum of 125° C.

2. A process as claimed in claim 1, wherein in the case of combinations of more than one different blue disperse dye of the structure shown by the formula, each of said single blue-type dyes is present in a proportion between 25% and 75% by weight in the blue component dye mixture.

3. The process as claimed in claim 1, wherein the proportion by weight of the blue components composed of the underlying disperse dye or of two or more different of such dyes of the structure shown by formula is 15% to 80% within the overall trichromatic composition of the additive color mixture.

4. The process as claimed in claim 1, wherein the yellow components used are disperse dyes of the following formulae

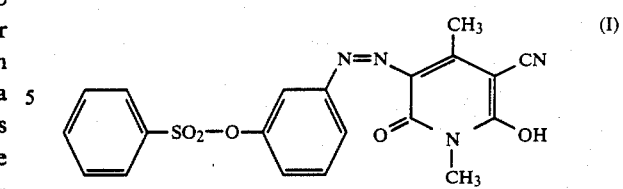

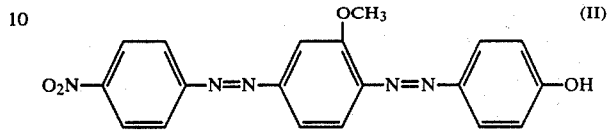

individually or in combination with each other, and the proportion by weight of the yellow component composed of the dyes of the formulae (I) and/or (II) within the overall composition of the additive color mixture is 10% to 30%.

5. The process as claimed in claim 1, wherein the red component used is composed of disperse dyes of the following formulae

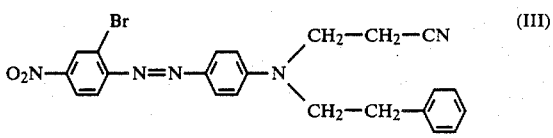

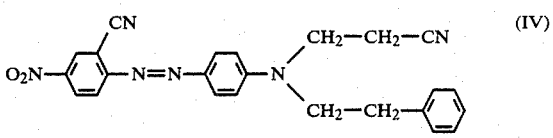

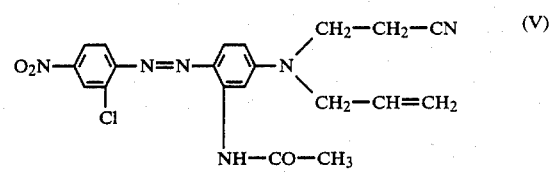

individually or in combination with one another, and the proportion by weight of the red component composed of the dyes of the formulae (III) and/or (IV) and/or (V) within the overall composition of the additive color mixture is 15% to 40%.

6. The process as claimed in claim 1, wherein the textile material is dyed at 115° C. to 120° C. for 60 to 90 minutes.

* * * * *